United States Patent [19]
Onishi

[11] Patent Number: 5,357,924
[45] Date of Patent: Oct. 25, 1994

[54] DIRECT-INJECTION TYPE COMPRESSION-IGNITION INTERNAL COMBUSTION ENGINE

[75] Inventor: Shigeru Onishi, Kanazawa, Japan

[73] Assignee: Nippon Clean Engine Research Institute Co., Ltd., Ishikawa, Japan

[21] Appl. No.: 978,681

[22] PCT Filed: Jun. 18, 1992

[86] PCT No.: PCT/JP92/00777

§ 371 Date: Feb. 3, 1993

§ 102(e) Date: Feb. 3, 1993

[87] PCT Pub. No.: WO93/00504

PCT Pub. Date: Jan. 7, 1993

[30] Foreign Application Priority Data

Jun. 21, 1991 [JP] Japan ................. 3-247156
Sep. 10, 1991 [JP] Japan ................. 3-230271

[51] Int. Cl.$^5$ ............................. F02F 3/26
[52] U.S. Cl. ................................... 123/276
[58] Field of Search ............... 123/276, 280, 308, 430, 123/500, 501, 432, 279

[56] References Cited

U.S. PATENT DOCUMENTS

| | | | |
|---|---|---|---|
| 4,770,138 | 9/1988 | Onishi | 123/276 |
| 5,103,776 | 4/1992 | Sato | 123/276 |
| 5,259,348 | 11/1993 | Kobayashi et al. | 123/276 |

FOREIGN PATENT DOCUMENTS

| | | |
|---|---|---|
| 0249699A3 | 12/1987 | European Pat. Off. |
| 0485610A1 | 5/1992 | European Pat. Off. |
| 3327998A1 | 2/1985 | Fed. Rep. of Germany |
| 3507459A1 | 9/1986 | Fed. Rep. of Germany |
| 595616 | 10/1925 | France |
| 2444166 | 11/1980 | France |
| 48-48808 | 7/1973 | Japan |
| 63-120815 | 5/1988 | Japan |
| 1-111135 | 7/1989 | Japan |
| 2-115916 | 9/1990 | Japan |
| WO85/00197 | 1/1985 | World Int. Prop. O. |
| WO91/19083 | 12/1991 | World Int. Prop. O. |
| WO91/19085 | 12/1991 | World Int. Prop. O. |

OTHER PUBLICATIONS

Tamanouchi et al., "Effect of Fuel Composition on Exhaust Gas Emissions from DI and DI Impingement Diffusion Combustion Diesel Engines," International Congress and Exposition of the Society of Automotive Engineers, Inc., Feb. 28–Mar. 3, 1994.

Kato et al., "Development of OSKA-DH Diesel Engine Using Fuel Jet Impingement and Diffusion Investigation of Mixture Formation and Combustion," International Congress and Exposition of the Society of Automotive Engineers, Inc., Feb. 28–Mar. 3, 1994.

*Primary Examiner*—Raymond A. Nelli
*Attorney, Agent, or Firm*—Oliff & Berridge

[57] ABSTRACT

A direct-injection type compression-ignition internal combustion engine, wherein a collision surface is formed in a cavity formed at the top surface of a piston and fuel is injected in the form of a continuous fluid flow from a fuel injector to the collision surface. The timing of the start of the fuel injection from the fuel injector is determined to near the compression top dead center and the initial combustion is performed in the cavity. The fuel colliding with the collision surface is pulled into the squish area due to the reverse squish flow caused when the piston descends after the compression top dead center and the majority of the combustion following the initial combustion is performed in the squish area after the compression top dead center.

14 Claims, 9 Drawing Sheets

DIRECT-INJECTION TYPE COMPRESSION-IGNITION INTERNAL COMBUSTION ENGINE

TECHNICAL FIELD

The present invention relates to a direct-injection type compression-ignition internal combustion engine.

BACKGROUND ART

The present applicant has already proposed an internal combustion engine which has a collision surface formed at the center portion of a cavity formed in the top surface of the piston, has the fuel injected from the fuel injector strike the collision surface to disperse from the collision surface in the circumferential directions in the cavity, then has the dispersed fuel ignited by a spark plug or glow plug (see Japanese Unexamined Patent Publication (Kokai) No. 63-120815). In such an internal combustion engine, the spark plug or glow plug is used to ignite the fuel, but later studies showed that if the method of formation of a fuel spray using such a collision action is applied to a compression-ignition internal combustion engine, the ignition lag time becomes extremely short and therefore combustion with a gentle rise in pressure can be obtained. Therefore, the present applicant has also applied for a patent for such a compression-ignition internal combustion engine as well (PCT/JP90/00718). In this compression-ignition internal combustion engine, substantially all the injected fuel is made to burn in the cavity formed at the top surface of the piston in the same way as a general compression-ignition internal combustion engine.

A cavity formed in the top surface of a piston inherently has a volume able to accommodate an amount of air sufficient for burning all the injected fuel and therefore if all the air in the cavity can be used for the combustion, then excellent combustion can be obtained even if substantially all of the injected fuel is made to burn in the cavity of the piston as mentioned above. To use all of the air in the cavity for the combustion, however, the injected fuel must be distributed uniformly in the cavity as a whole. Nevertheless, to cause the injected fuel to uniformly distribute in the cavity as a whole is difficult for a general compression-ignition internal combustion engine, of course, and even more so for a compression-ignition internal combustion engine where the injected fuel is made to collide with a collision surface. Therefore, there is the problem that if substantially all of the injected fuel is made to burn in the cavity of the piston, the rate of utilization of the air becomes insufficient and therefore a large amount of unburned hydrocarbons and smoke is generated.

DISCLOSURE OF THE INVENTION

The object of the present invention is to provide a compression-ignition internal combustion engine which can tremendously raise the thermal efficiency while tremendously suppressing the generation of harmful components and smoke by using a novel combustion method.

According to the present invention, there is provided a direct-injection type compression-ignition internal combustion engine wherein a cavity is formed on the top surface of a piston, a fuel injector is disposed on the inner wall surface of a cylinder head above the center of the cavity, a collision portion provided with a collision surface is provided below the fuel injector, the fuel injected from the fuel injector is made to collide with the collision surface, and the collided injected fuel is made to disperse from the collision surface in the radial directions of the cavity, wherein the timing of the start of the fuel injection is set to near the top dead center of the compression stroke, the initial combustion is made to be performed in the cavity, and the remaining majority of the combustion following the initial combustion is made to be performed between the top surface of the piston around the cavity and the inner wall surface of the cylinder head.

BEST MODE FOR CARRYING OUT THE INVENTION

Figure 1:
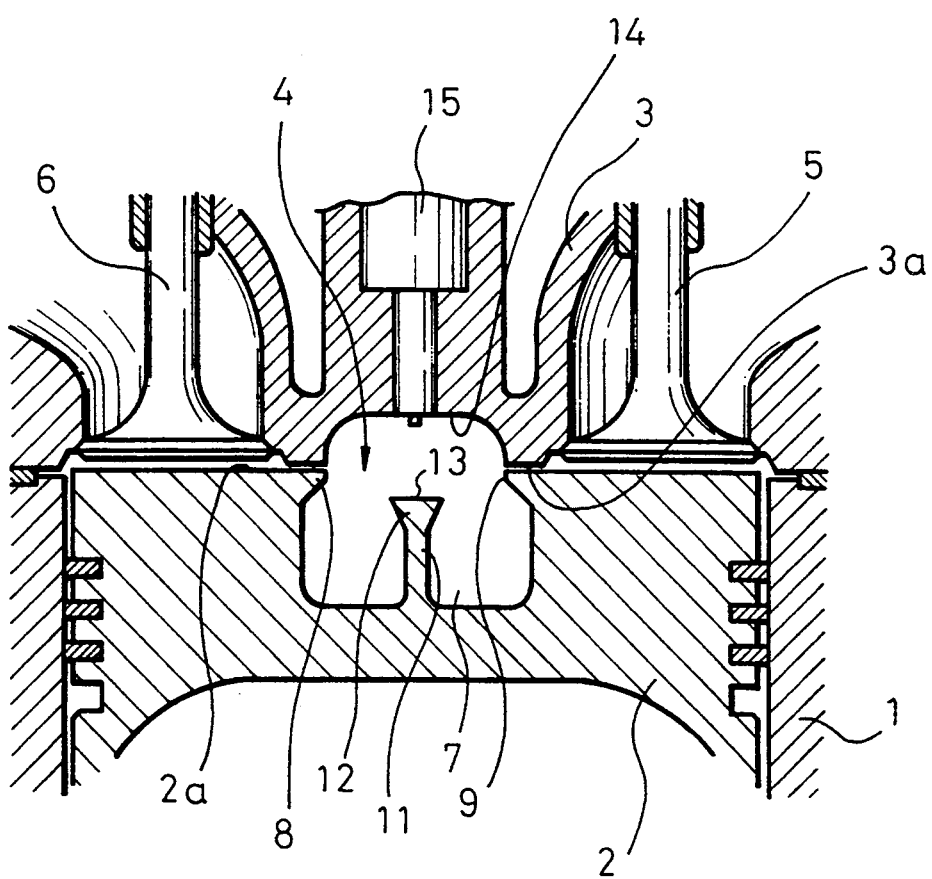
FIG. 1 is a side sectional view of a direct-injection type compression-ignition internal combustion engine.
Figure 2:
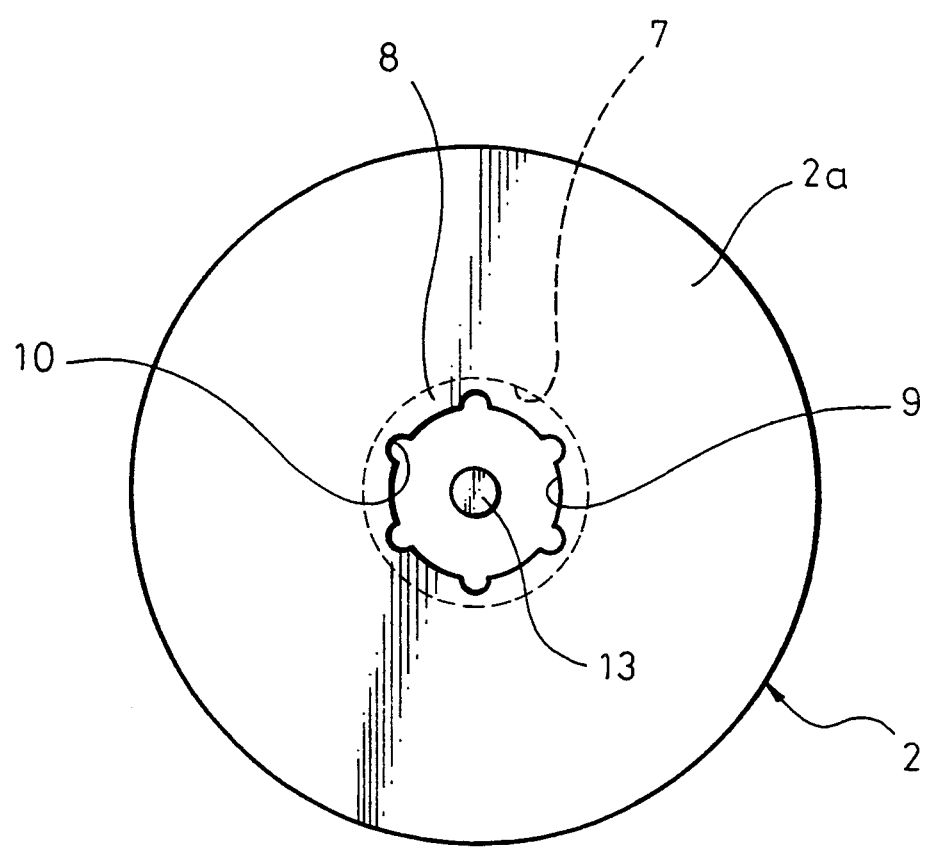
FIG. 2 is a plan view of a piston.
Figure 3:
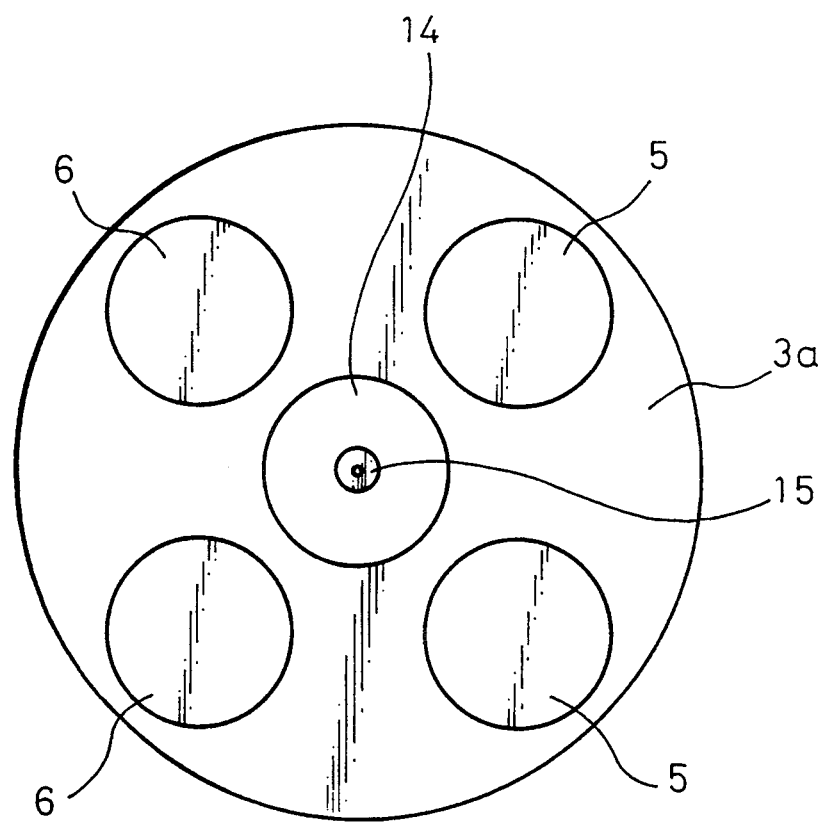
FIG. 3 is a bottom view of a cylinder head.

Referring to FIG. 1 to FIG. 3, 1 is a cylinder block, 2 is a piston moving reciprocally in the cylinder block 1, 3 is a cylinder head fastened on the cylinder block 1, 4 is a combustion chamber formed between the piston 2 and the cylinder head 3, 5 is a pair of intake valves, and 6 is a pair of exhaust valves. A cavity 7 is formed in the center of the flat top surface 2a of the piston 2 and a lip portion 8 projecting inward is formed at the top of the circumferential wall of the cavity 7. A cavity top opening 9 having a sectional area smaller than the sectional area of the cavity center is formed by the lip portion 8. At the periphery of the cavity top opening 9 are formed depressions 10 having arc-like contour shapes at equiangular intervals.

A supporting member 11 projecting upward is formed integrally at the center of the bottom wall surface of the cavity 7, while a collision member 12 is formed integrally at the top of the supporting member 11. At the top surface of the collision member 12 is formed a substantially flat collision surface 13. On the other hand, a second cavity 14 is formed at the center of a flat inner wall surface 3a of the cylinder head 3 so as to cover the entire top opening 9 of the cavity 7. A fuel injector 15 is disposed at the center of the second cavity 14 above the collision surface 13.

Figure 4:
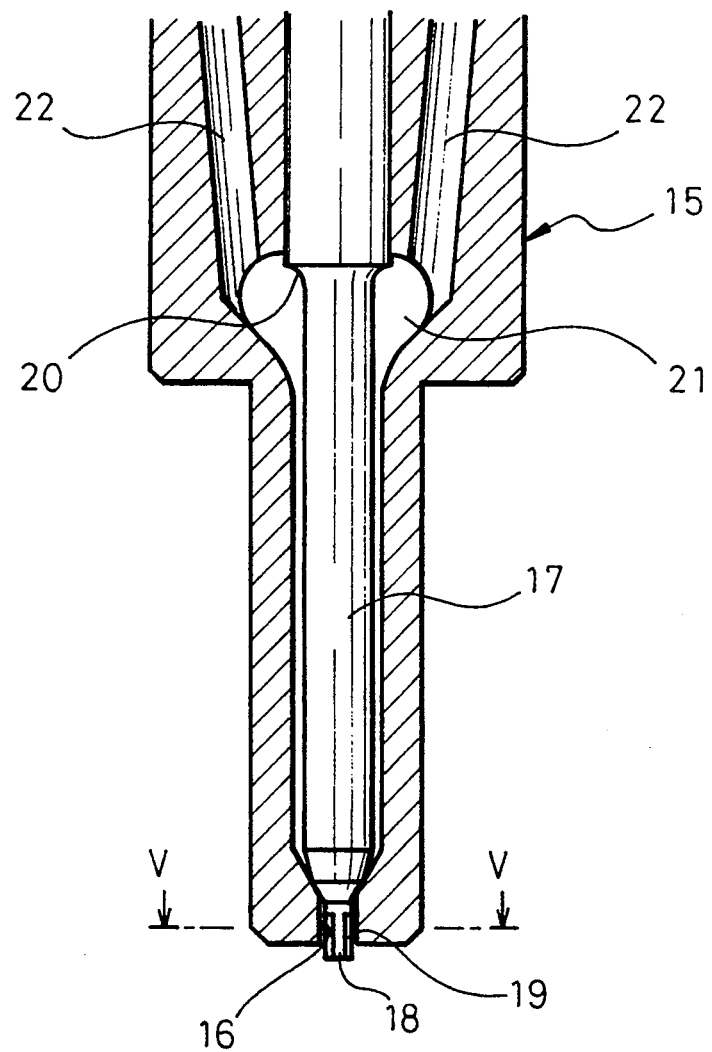
FIG. 4 is an enlarged side sectional view of the front end portion of the fuel injector.
Figure 5:
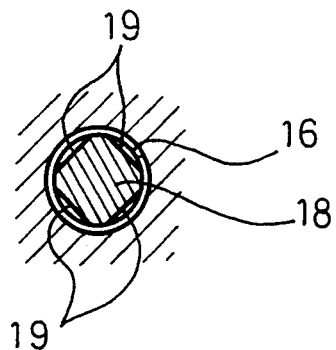
FIG. 5 is a sectional view seen along the line V—V in FIG. 4.

In the embodiment shown from FIG. 1 to FIG. 3, as shown in FIG. 4 and FIG. 5, the fuel injector 15 is provided with a nozzle bore 16 having a cylindrical shape and a needle 17 for controlling the opening and closing of the nozzle bore 16. The needle 17 has a tip portion 18 which is formed coaxially with respect to the nozzle bore 16 and has a diameter slightly smaller than the nozzle bore 16. On the outer circumferential surface of the tip portion 18 are formed cutaway portions 19, comprised of four flat surfaces, at equiangular intervals. Further, a plurality of fuel supply channels 22 disposed point-symmetrically with respect to the axis of the needle 17 are connected to a fuel reservoir 21 formed around the pressure receiving face 20 of the needle 17. The high pressure fuel discharged from the fuel pump (not shown) is supplied to the fuel reservoir 21 through the fuel supply channels 22. When the fuel pressure in the fuel reservoir 21 exceeds a certain pressure, the needle 17 rises and the fuel is injected from the nozzle bore 16.

Figure 6:
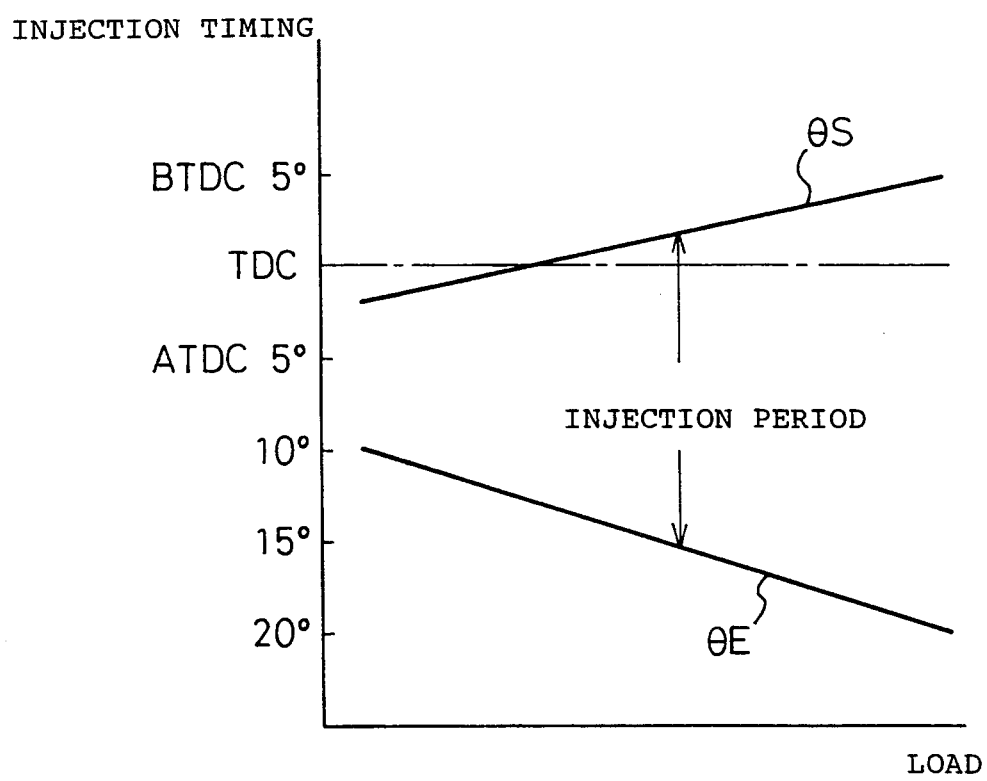
FIG. 6 is a view showing the timing of the fuel injection.

Fuel is injected from the fuel injector 15 toward the center portion of the collision surface 13. The actual injection timing of the fuel injection is shown in FIG. 6. Note that in FIG. 6, $\theta S$ indicates the starting timing of injection, while $\theta E$ indicates the ending timing of the injection. Further, in FIG. 6, the abscissa indicates the engine load. As will be understood from FIG. 6, during engine low load operation, the fuel injection is started after the compression top dead center TDC, therefore at this time the entire injected fuel is injected after the compression top dead center TDC. On the other hand, the starting timing of the injection $\theta S$ is advanced the higher the engine load. If the engine load rises, the fuel injection is started slightly before the compression top dead center TDC. Even if the starting timing $\theta S$ of injection is advanced, the injection period after the compression top dead center TDC is far longer than the injection period before the compression top dead center TDC and therefore the majority of the injected fuel is made to burn after the compression top dead center TDC, it will be understood.

Figure 7:
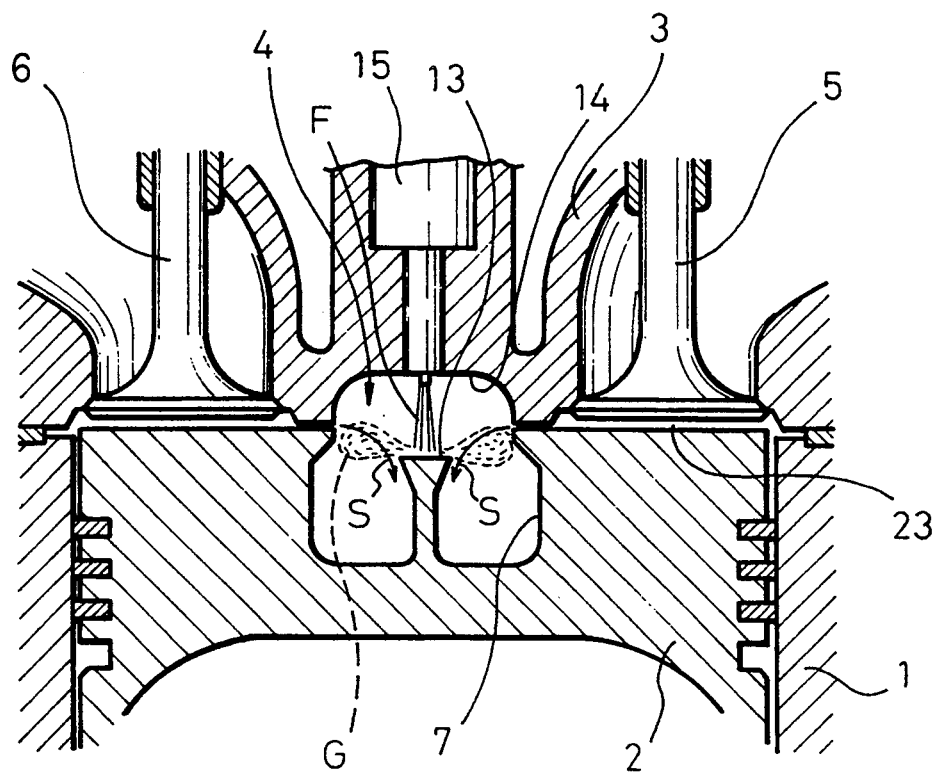
FIG. 7 is a side sectional view of the internal combustion engine showing the state immediately after the start of the fuel injection.
Figure 8:
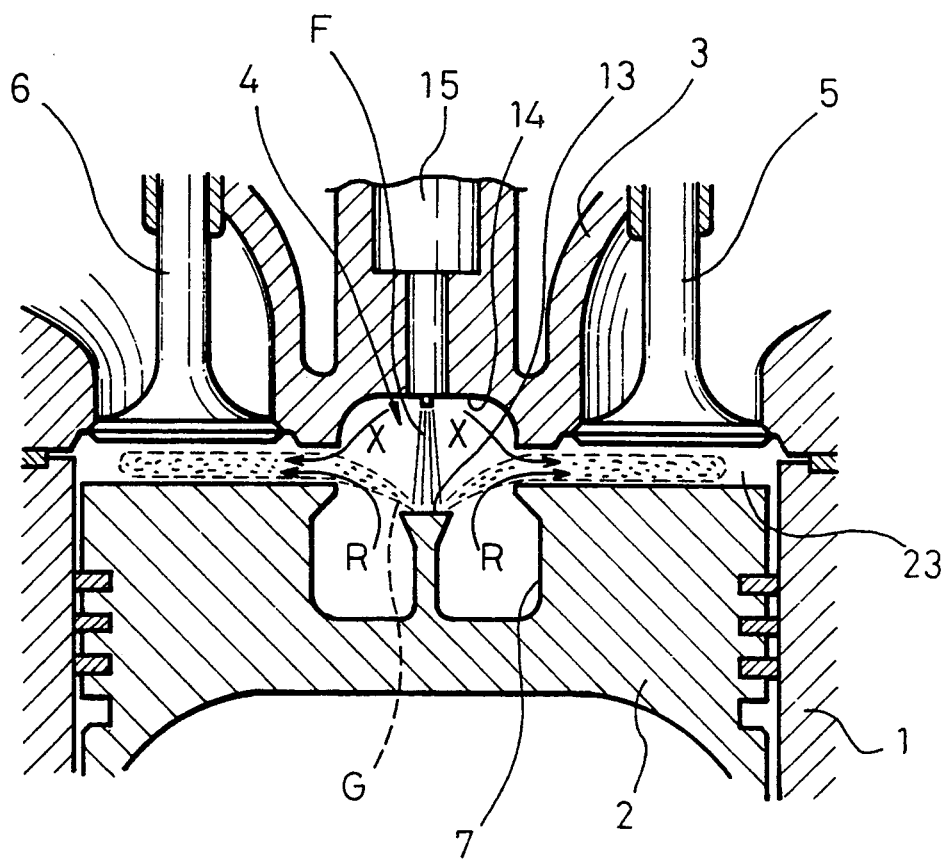
FIG. 8 is a side sectional view of an internal combustion engine showing the state immediately before the completion of fuel injection.
Figure 9:
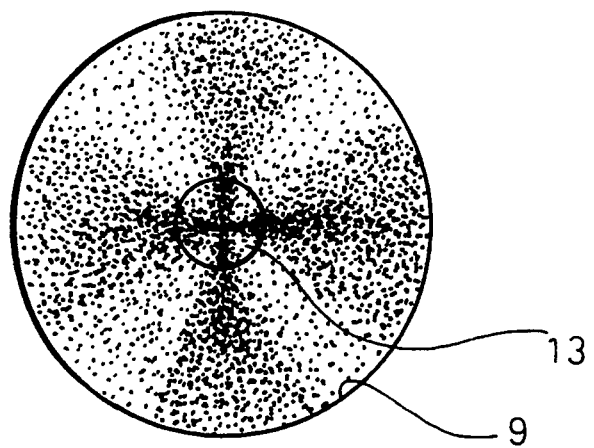
FIG. 9 is a plan view of a piston cavity showing the spray pattern.

FIG. 7 shows the state directly after the fuel injection is started. FIG. 8 shows the state directly before the fuel injection is ended. FIG. 9 shows the state of spread of the fuel which has collided with the collision surface 13.

As shown in FIG. 7, when the piston 2 approaches the top dead center TDC, a squish area 23 is formed between the circumferential portion of the top surface 2a of the piston and the circumferential portion of the inner wall surface 3a of the cylinder head. A squish flow is sprayed into the cavity 7 as shown by the arrows S from the squish area 23. On the other hand, when the piston 2 reaches near the top dead center, as shown by F in FIG. 7, the fuel is injected from the fuel injector 15 toward the center portion of the collision surface 13 in the form of a continuous fluid flow. The injected fuel F is made to collide at the center portion of the collision surface 13 in the form of the continuous fluid flow. At this time, part of the injected fuel immediately atomizes due to the collision energy, while the remaining fuel flows in all directions toward the peripheral portions of the collision surface 13 in the form of a flowing liquid film. Next, the flowing liquid film splits at the peripheral portions of the collision surface 13 to become fine fuel particles, which fine fuel particles fly in all directions from the collision surface 13. Therefore, in the cavity 7, as shown in FIG. 9, a fuel spray heading from the collision surface 13 to the peripheral portions of the cavity 7 is formed. The fuel atomized immediately by the collision with the collision surface 13 has no penetration force and therefore the atomized fuel collects around the collision surface 13. On the other hand, since the fuel injection is performed near the compression top dead center TDC, the pressure and the temperature inside the combustion chamber 4 when the fuel injection is performed become considerably high. Therefore, the fuel atomized immediately by the collision with the collision surface 13 is instantaneously ignited and thus the ignition lag period becomes extremely short. Further, since the fuel which is first ignited is the atomized fuel collecting around the collision surface 13, the fuel ignition is started from the center portion of the cavity 7. Next, the ignition flame propagates from around the collision surface 13 toward the circumferential portions of the cavity 7 in all directions and the initial combustion is performed in the cavity 7. As will be understood from FIG. 6, at the time of engine low load operation, the initial combustion is performed after the compression top dead center TDC, while at the time of engine high load operation, the initial combustion is performed near the compression top dead center TDC.

Next, when the piston 2 starts to descend, as shown by R in FIG. 8, a reverse squish flow which draws the gas in the cavity 7 into the squish area 23 is generated. Further, when the initial combustion of the fuel spray G in the cavity 7 is performed, the gas in the cavity 7 expands and as a result the burned gas and the air in the cavity 7 pass through the top opening 9 of the cavity 7 and flow out from the cavity 7. Therefore, the burned gas and air in the cavity 7 are sent into the squish area 23 by the reverse squish flow R and the expansion action of the gas in the cavity 7. At this time, the fuel spray G dispersing in all directions and the ignition flame are led successively into the squish area 23 by the burned gas and air heading from inside the cavity 7 to the squish area 23. The fuel spray G sent into the squish area 23 is successively burned in the squish area 23.

Therefore, in the present invention, after the compression top dead center TDC after the initial combustion is performed in the cavity 7, the later stage combustion is performed in the squish area 23. As will be understood from FIG. 6, even at the time of engine high load operation, the majority of the fuel is injected after the compression top dead center TDC and therefore the majority of the fuel is burned in the squish area 23 after the compression top dead center TDC. In this way, if the majority of the combustion is performed after the compression top dead center TDC, the major portion of the combustion energy is effectively converted into output torque and therefore the thermal efficiency is improved.

However, it is possible to burn the majority of the injected fuel well after the compression top dead center TDC in the present invention in this way because the injected fuel is made to collide with the collision surface 13 to disperse fine particles of fuel in all directions from the collision surface 13 and further is made to burn in the squish area 23. That is, if the fine particles of fuel are made to disperse from the collision surface in all directions, when a reverse squish flow R is generated, the majority of the successively injected fuel is successively sent into the squish area 23. Further, at this time, the successively injected fuel is made to distribute relatively uniformly through the entire region in the squish area 23. Also, even if the initial combustion is performed in the cavity 7, there is a large amount of air in the cavity 7 which does not contribute to the combustion and therefore when the gas in the cavity 7 is sent into the squish area 23 by the action of gas expansion in the cavity 7 caused by the initial combustion and the reverse squish flow R, the large amount of air included in the gas is mixed sufficiently with the fuel spray G. As a result, excellent combustion is obtained even after the compression top dead center TDC.

Note that to obtain excellent combustion after the compression top dead center TDC in the above way, it is necessary to make the fuel colliding with the collision surface 13 disperse from the collision surface 13 in all directions. Therefore, it is necessary to make the fuel be injected from the fuel injector 15 in a continuous fluid flow and make the injected fuel collide with the collision surface 13 in the form of a liquid without being changed into fine particles. In this case, of course, it is impossible to prevent all the fuel injected from the fuel injector 15 from being changed into fine particles and therefore in actuality it ends up that part of the fuel injected from the fuel injector 15 collides with the collision surface 13 in the form of a liquid without being changed into fine particles. At this time, the fuel sometimes collides with the collision surface 13 in the form of a continuous fluid flow and sometimes splits up after injection and collides with the collision surface 13 in the form of masses of fluid. Whatever the case, in the present invention, the injected fuel is made to change to fine particles by being made to collide with the collision surface 13, so it is necessary to make the injected fuel collide on the collision surface 13 at as high a speed as necessary and therefore the fuel is made to be injected from the fuel injector 15 in the form of a continuous fluid flow. That is, the fuel injected in the form of a continuous fluid flow has a large penetration force, so it does not slow down in speed much at all until colliding with the collision surface 13, thus even if the fuel injection pressure of the fuel injected from the fuel injector 15 is made from 100 kg/cm$^2$ to 150 kg/cm$^2$ or so, it is possible to make the injected fuel collide with the collision surface 13 at a high speed. As a result, the collided fuel disperses from the collision surface 13 to all directions and therefore the majority of the fuel can be burned well in the squish area 23 after the compression top dead center TDC.

Note that if the injected fuel is made to collide with the collision surface 13 in the above way, the ignition lag period becomes shorter and further the initial ignition is performed in the center portion of the cavity 7 around the collision surface 13. Next, when the gas in the cavity 7 expands and a reverse squish flow R occurs, the fuel spray G disperses toward the inside of the squish area 23 while spreading in all directions. In other words, the fuel spray G spreads while dispersing into the air. At this time, the flame propagates as if chasing after the fuel spray G spreading while dispersing in the air, so the fuel spray G in the squish area 23 is burned in a state with sufficient air around the fine fuel particles and therefore excellent combustion can be obtained with no generation of unburned hydrocarbons, nor any production of soot. On the other hand, burned gas is included in the gas heading from the cavity 7 to the squish area 23, which burned gas exerts an internal exhaust gas recirculation action for the later stage combustion in the squish area 23. Therefore, the combustion speed is suitably suppressed, so the maximum combustion temperature becomes lower and therefore the generation of nitrogen oxides can be suppressed. This method of combustion forms the basis of the present invention.

If the majority of the combustion is performed after the compression top dead center TDC as explained above, the majority of the combustion energy is converted efficiently to output torque, so the thermal efficiency can be improved. This is well known and needs no explanation. In this case, however, the thermal efficiency is improved in the case where excellent combustion is performed after the compression top dead center TDC. In general direct-injection type compression-ignition internal combustion engines, however, if the majority of the combustion is attempted to be performed after the compression top dead center TDC, the combustion will deteriorate and improvement of the thermal efficiency will be impossible. An explanation will be made of this next with reference to FIG. 11 and FIG. 12.

Figure 11:
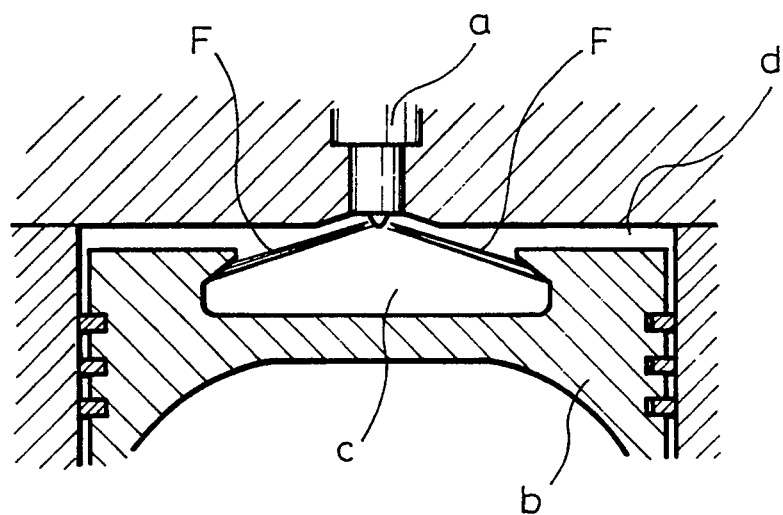
FIG. 11 is a side sectional view of a general direct-injection type compression-ignition internal combustion engine.
Figure 12:
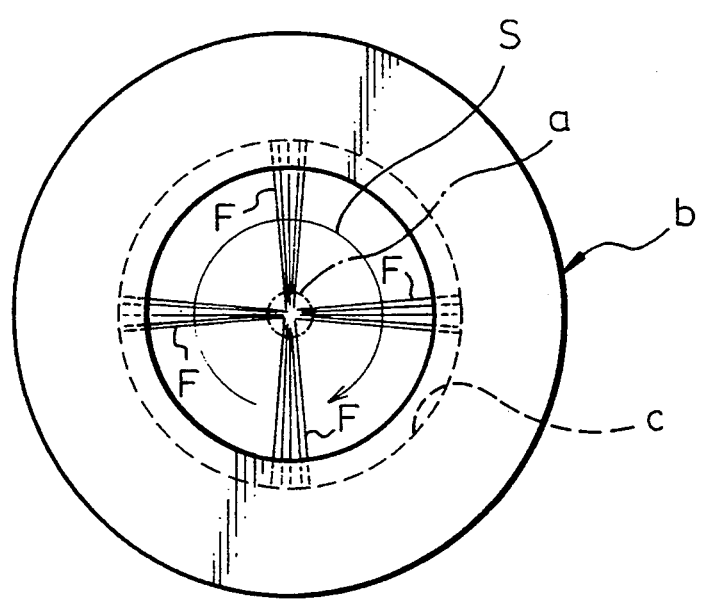
FIG. 12 is a plan view of the piston shown in FIG. 11.

FIG. 11 and FIG. 12 show a compression-ignition internal combustion engine in which the fuel injector a has four hole nozzles and fuel F is injected from the hole nozzles toward the inner circumferential wall of the cavity c of the piston b. In such a compression-ignition internal combustion engine, a swirl such as shown by the arrow S in FIG. 12 is generated in the cavity c, which swirl S is made to disperse the injected fuel F inside the cavity c. Even in such a compression-ignition internal combustion engine, however, for example, if the injection starting timing is made close to the top dead center, when the fuel F is injected from the fuel injector a, a reverse squish flow heading from the cavity c to the squish area d is generated. In the case where the fuel F is injected from the hole nozzles toward the inner circumferential wall of the cavity c in this way, however, the penetration force of the flows of injected fuel F is strong and therefore an extremely small part of the fuel dispersed by the swirl S is carried to the inside of the squish area d by the reverse squish flow, but the main flows of injected fuel F head toward the inner circumferential surface of the cavity c without being carried to the squish area d. That is, in such a compression-ignition engine, even if the fuel is injected after the compression top dead center TDC, the majority of the injected fuel is supplied inside the cavity c and is burned in the cavity c.

When a majority of the injected fuel is made to burn in the cavity c in this way, however, the air inside the cavity c cannot be sufficiently utilized, so excellent combustion cannot be obtained and thus a large amount of unburned hydrocarbons or smoke is generated, as mentioned at the start. The same applies in the case of use of a fuel injector a having more than four hole nozzles. Therefore, so long as the fuel is injected from the hole nozzles to the inner circumferential wall of the cavity c, if the fuel is injected after the compression top dead center TDC, the combustion deteriorates and therefore rather than the thermal efficiency being improved, the thermal efficiency conversely falls. Therefore, in such a compression-ignition internal combustion engine, there is a ceiling on the thermal efficiency which cannot be broken through. The present invention makes use of the novel method of combustion of performing the initial combustion in the cavity 7 and performing the majority of the combustion in the squish area 23 after the compression top dead center TDC so breaks through the previously unbreakable barrier of thermal efficiency in general compression-ignition internal combustion engines and at the same time is able to tremendously reduce the amount of generation of unburned hydrocarbons, nitrogen oxides, smoke, etc. which could not be lowered to under a certain limit in general compression-ignition internal combustion engines, therefore the effect brought about by this novel combustion method may be said to be extremely great.

As will be understood from FIG. 6, in the embodiment according to the present invention, during engine low load operation, the fuel injection is started after the compression top dead center TDC and therefore both the initial combustion in the cavity 7 and the later stage combustion in the squish area 23 are performed after the compression top dead center TDC. As opposed to this, during engine high load operation, the fuel injection starting timing $\theta S$ is advanced compared with at engine low load operation and therefore the amount of fuel which is burned in the cavity 7 is increased. If the amount of fuel which is burned in the cavity 7 is increased, the action of expansion of the gas caused by the initial combustion in the cavity 7 becomes stronger and therefore even if the injection period becomes longer during engine high load operation, the strong expansion action of the gas in the cavity 7 enables the air in the cavity 7 to be sent into the squish area 23 well.

Further, if the amount of fuel which is burned in the cavity 7 is increased, the amount of the burned gas produced in the cavity 7 by the initial combustion increases and therefore the amount of the burned gas sent into the squish area 23 also increases. Therefore, during engine high load operation, even if the amount of fuel injection increases and the amount of heat generated increases, the internal exhaust gas recirculation action of the burned gas is strengthened, so the generation of nitrogen oxides is suppressed.

Note that if the fuel injection starting timing $\theta S$ is advanced in this way, the amount of fuel which can be burned in the cavity 7 increases and therefore the ratio of the initial combustion in the cavity 7 and the later stage combustion in the squish area 23 can be freely adjusted by changing the fuel injection timing $\theta S$. In this case, the fuel injection starting timing $\theta S$ is determined with consideration to the thermal efficiency and the amount of generation of toxic components. Sometimes, even during engine high load operation, it is even preferable to start the fuel injection after the compression top dead center TDC. Whatever the case, there is no change in the fact that the majority of the fuel is burned in the squish area 23.

In the present invention, however, as mentioned earlier, the air in the cavity 7 is led into the squish area 23 and that air is used to burn the fuel led into the squish area 23. In this case, to further improve the combustion in the squish area 23, it is preferable to further introduce air. Toward this end, it is preferable to form a second cavity 14 at the center portion of the inner wall surface of the cylinder head. If such a second cavity 14 is provided, when the reverse squish R is caused, air in the second cavity 14 is drawn into the squish area 23 as shown by the arrows X in FIG. 8 and therefore a large amount of air is supplied inside the squish area. As a result, a much better later stage combustion is obtained in the squish area 23.

Further, another important thing in the present invention is that the fuel colliding with the collision surface 13 be dispersed throughout the cavity 7 as a whole and that the initial ignition be performed at the center portion of the cavity 7. Therefore, it is preferable to use a fuel injector 15 such as shown in FIG. 4 and FIG. 5.

That is, if use is made of a needle 17 with cutaway portions 19 such as shown in FIG. 4 and FIG. 5, the fuel ejected from the nozzle bore 16 is divided into four main flows and as a result, as shown in FIG. 9, the fuel colliding with the collision surface spreads symmetrically in the four directions with the same spray patterns. In this case, at the center portions of the spray patterns, there are rough particles of fuel having a strong penetration force, so these rough fuel particles fly to near the inner circumferential surface of the cavity 7 and thus it is possible to distribute the injected fuel to every corner of the cavity 7. As opposed to this, fine fuel particles with almost no penetration force collect around the collision surface 13, which fine fuel particles are ignited first. Therefore, if use is made of the needle 17 shown in FIG. 4 and FIG. 5, the fuel colliding with the collision surface 13 is dispersed throughout the cavity 7 as a whole and the initial ignition can be performed at the center portion of the cavity 7.

Further, in this embodiment of the present invention, a large number of depressions 10 are formed in the lip portion 8. If a large number of depressions 10 are formed in the lip portion 8 in this way, a strong turbulence is given to the gas passing through the throttle portion 9 by these depressions 10. As a result, the mixture between the fuel spray G and the air in the squish area 23 is promoted and therefore a better combustion can be obtained. Further, in the embodiment according to the present invention, as shown in FIG. 1, to prevent the velocity of the gas flowing out from the throttle portion 9 from being reduced as much as possible, the outer circumferential wall surface of the collision member 12 has a conical shape diverging upward.

Figure 10:
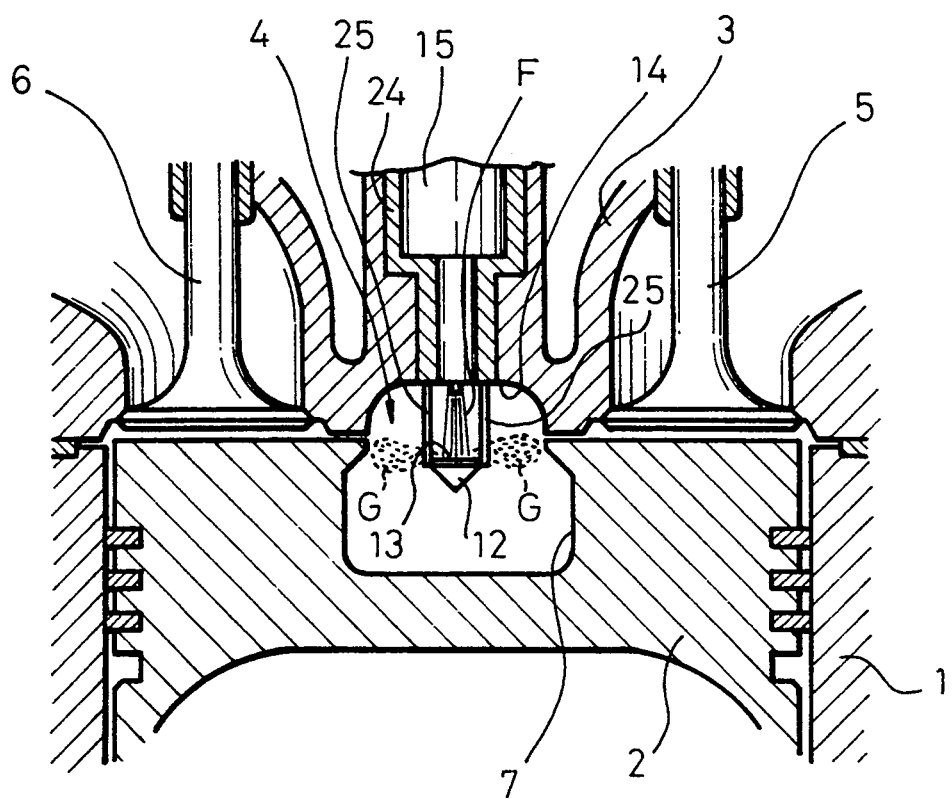
FIG. 10 is a side sectional view showing another embodiment of a direct-injection type compression-ignition internal combustion engine.

FIG. 10 shows another embodiment. In this embodiment, a fuel injector holder 24 is fitted in the cylinder head 3, with the fuel injector 15 being supported in the fuel injector holder 24. Further, in this embodiment, the collision member 12 having a collision surface 13 is supported by the fuel injector holder 24 through supporting members 25. In this embodiment, as shown in FIG. 10, when the piston 2 reaches top dead center, the collision surface 13 is positioned in the cavity 7.

In both of the embodiments shown in FIG. 1 and FIG. 10, use may be made, of course, of gasoline, but also of methanol, kerosine, fuel oil, various synthetic fuels, vegetable oils, and other liquid fuels. Further, in all of the embodiments, there is no need to cause a swirl in the combustion chamber 4, so the air feed resistance may be made small and a high air feed efficiency obtained. Further, in all of the embodiments, as mentioned earlier, the ignition lag was shortened extremely and the rate of pressure rise and maximum combustion temperature were suppressed, so the combustion noise was lowered and the amount of generation of nitrogen oxides tremendously reduced. Also, the rate of air utilization is enhanced, so the generation of smoke is suppressed. Further, there is no deposition of the injected fuel on the inner wall surface of the combustion chamber 4, so the amount of unburned hydrocarbons is tremendously reduced. Further, the overall thermal efficiency is heightened, so the amount of generation of $CO_2$ is reduced. Still further, there is the advantage that there no need for raising the fuel injection pressure.

As mentioned above, according to the present invention, it is possible to tremendously improve the thermal efficiency while tremendously reducing the generation of unburned hydrocarbons, nitrogen oxides, and other harmful components and smoke.

I claim:

1. A direct-injection type compression-ignition internal combustion engine, comprising:
   a cavity formed in the top surface of a piston;
   a fuel injector disposed on an inner wall surface of a cylinder head above a center of the cavity;
   a collision portion having a collision surface provided below the fuel injector, wherein fuel injected from the fuel injector is made to collide with the collision surface, and the collided injected fuel is made to disperse from the collision surface in the radial directions of the cavity, in which direct-injection type compression-ignition internal combustion engine the timing of the start of the fuel injection is set to near the compression top dead center so that more than half the injection period of fuel exists after the compression top dead center, the initial combustion is performed in the cavity, and the remaining combustion following the initial combustion is performed between the top surface of the piston around the cavity and the inner wall surface of the cylinder head.

2. The direct-injection type compression-ignition internal combustion engine as set forth in claim 1, wherein said collision portion is positioned by the piston and said collision surface is positioned in the cavity.

3. The direct-injection type compression-ignition internal combustion engine as set forth in claim 1, wherein said collision portion is supported by the cylinder head and said collision surface is positioned in the cavity when the piston reaches top dead center.

4. The direct-injection type compression-ignition internal combustion engine as set forth in claim 1, wherein said collision surface is substantially flat.

5. The direct-injection type compression-ignition internal combustion engine as set forth in claim 1, wherein the fuel is injected from the nozzle bore of the fuel injector toward the collision surface in the form of a continuous fluid flow and the fuel is made to collide with the collision surface in the form of a liquid without being changed into fine particles.

6. The direct-injection type compression-ignition internal combustion engine as set forth in claim 1, wherein the top surface of the piston around the cavity is formed from a flat surface, a squish area is formed between the flat surface of the top of the piston around the cavity and the inner wall surface of the cylinder head when the piston reaches the compression top dead center, the fuel dispersed from the collision surface is led to the inside of the squish area by the reverse squish flow caused when the piston begins its descent from the compression top dead center, and the remaining majority of the combustion following the initial combustion is made to be performed in the squish area.

7. The direct-injection type compression-ignition internal combustion engine as set forth in claim 6, wherein the fuel colliding with the collision surface is dispersed in the direction of the squish area.

8. The direct-injection type compression-ignition internal combustion engine as set forth in claim 6, wherein a second cavity is formed on the inner wall surface of the cylinder head above said cavity and covers said cavity.

9. The direct-injection type compression-ignition internal combustion engine as set forth in claim 1, wherein the fuel injection is started after the compression top dead center at a time of engine low load operation.

10. The direct-injection type compression-ignition internal combustion engine as set forth in claim 9, wherein the timing of the start of the fuel injection is advanced along with a rise in the engine load.

11. The direct-injection type compression-ignition internal combustion engine as set forth in claim 10, wherein the fuel injection is started before the compression top dead center at a time of engine high load operation.

12. The direct-injection type compression-ignition internal combustion engine as set forth in claim 1, wherein fine fuel particles formed at the cavity center around the collision surface by the collision with the collision surface are made to ignite first.

13. The direct-injection type compression-ignition internal combustion engine as set forth in claim 12, wherein the fuel injector is provided with a nozzle bore and a needle, said needle has a tip portion which is disposed coaxially with the nozzle bore in the nozzle bore and has a diameter smaller than the nozzle bore, and cutaway portions are formed at equiangular intervals on the outer circumferential surface of an tip portion.

14. The direct-injection type compression-ignition internal combustion engine as set forth in claim 1, wherein a lip portion projecting inward is formed at the top of a inner circumferential wall surface of the cavity and a plurality of depressions are formed at equiangular intervals in the lip portion.

* * * * *